US012792233B2

(12) United States Patent
Chan

(10) Patent No.: US 12,792,233 B2
(45) Date of Patent: Nov. 10, 2026

(54) SELF-ADAPTIVE POWER ADJUSTMENT FOR NVMe DRIVES

(71) Applicant: Hewlett Packard Enterprise Development LP, Spring, TX (US)

(72) Inventor: Bo-Hsiang Chan, Taipei City (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/974,542

(22) Filed: Dec. 9, 2024

(65) Prior Publication Data

US 2026/0161309 A1 Jun. 11, 2026

(51) Int. Cl.
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
See application file for complete search history.

(56) References Cited

U.S. PATENT DOCUMENTS

2016/0320995 A1* 11/2016 Warriner ................. G06F 1/206
2017/0269860 A1* 9/2017 Geml ..................... G06F 3/0634
2019/0227961 A1* 7/2019 Osawa .................. G06F 3/0632
2020/0333870 A1* 10/2020 Vaysman .............. G06F 1/3275
2022/0300061 A1* 9/2022 He ......................... G06F 3/0634
2022/0301598 A1* 9/2022 Eemani ..................... G11C 7/04
2023/0104685 A1* 4/2023 Leung ........................ G06F 1/28 713/320
2023/0142174 A1* 5/2023 Lee ....................... G06F 3/0622 711/154
2024/0311010 A1* 9/2024 Fujimoto ................ G06F 3/061
2025/0110542 A1* 4/2025 Reimers ................ G06F 1/3275
2025/0355580 A1* 11/2025 MacLean .............. G06F 3/0659

OTHER PUBLICATIONS

Khamamkar et al., Analyzing Power Management in Non-Volaile Memory Express (NVMe) Solid State Drives, Dec. 18, 2019, IEEE (Year: 2019).*

NVM Express, NVM Express Base Specification, Jul. 23, 2021, available at: https://nvmexpress.org/wp-content/uploads/NVMe-NVM-Express-2.0a-2021.07.26-Ratified.pdf (Year: 2021).*

* cited by examiner

*Primary Examiner* — Ryan Bertram
(74) *Attorney, Agent, or Firm* — Slater Matsil, LLP

(57) ABSTRACT

Memory device controlled is described herein. Specifically, a computing system includes a memory device and a processor. The processor is configured to operate the memory device for a first period of time using a first power state descriptor for the memory device. Moreover, the first power state descriptor is lower than a performance target for the memory device. The processor is further configured to operate the memory device within a threshold of the performance target by switching from the first power state descriptor to a second power descriptor for the memory device. Furthermore, the second power state descriptor is higher than the performance target for the memory device.

20 Claims, 7 Drawing Sheets

SELF-ADAPTIVE POWER ADJUSTMENT FOR NVMe DRIVES

BACKGROUND

Computing devices, such as desktop computers or servers, may deploy memory to store data and/or instructions. Such memory devices consume power for the computing devices that contribute to an overall power consumption for such computing devices.

BRIEF DESCRIPTION OF THE DRAWINGS

Features, aspects, and advantages of the present disclosure will become better understood when the following detailed description is read with reference to the accompanying drawings in which like characters represent like parts throughout the drawings, wherein.

DETAILED DESCRIPTION

The present disclosure relates generally to implementing power management in a memory device, such as a non-volatile memory express (NVMe) device. In such devices, power management may be used to control thermal power generation and/or power draw. Thus, power management circuitry of the memory device may limit performance to stay within specific levels.

One method of controlling power states of memory devices includes using power state descriptors (PSDs) to set power states. Each of the PSDs corresponds to a power state that provides a cap on power consumption that enables a user to control power consumption. The PSDs may set such caps using a processor/controller, such as a baseboard management controller (BMC) and/or using a BIOS/OS running in a central processing unit (CPU). PSDs may be used to control power consumption to reduce temperatures and/or total system power draw.

Some computing devices, such as enterprise servers, may use different vendors for its memory devices in a multiple-vendor (MV)-sku strategy. The MV-sku strategy enables using parts from different vendors to prevent a shortage from a single supplier bottlenecking production by adding an inordinate amount of delay for a single vendor. However, the devices from different vendors may have different PSDs with their own performance gaps.

To overcome this vendor-to-vendor variance and/or other mismatches between granularity between available power states and target performance levels, an NVMe device may utilize a conditional scheme that alternates (i.e., time multiplexes) between more than one PSD during operation. For instance, if a thermal/performance target is located between these multiple PSDs, alternating between these PSDs on different sides of the target may average out to achieving the target. Thus, the NVMe device may have enhanced performance without overloading a thermal capability for the target. By switching between a higher PSD with thermal and/or other performance metrics greater than the target and a lower PSD with thermal and/or other performance metrics lower than the target, the target may be more closely matched by alternating between power states using different PSDs than if using the lower PSD continuously. In other words, operation within a threshold of the target may be maintained using such switching that may not be achievable with continuous usage of a particular PSD. This is true especially when no PSDs correspond to a power state within the threshold of the target. Indeed, continuous use of lower PSD may leave some thermal dissipation capability unused in exchange for staying under the thermal target with less performance efficiency. Moreover, by switching between the higher PSD and the lower PSD, the target may be more closely matched without overloading the thermal capability that may occur if continuously using the higher PSD.

Figure 1:
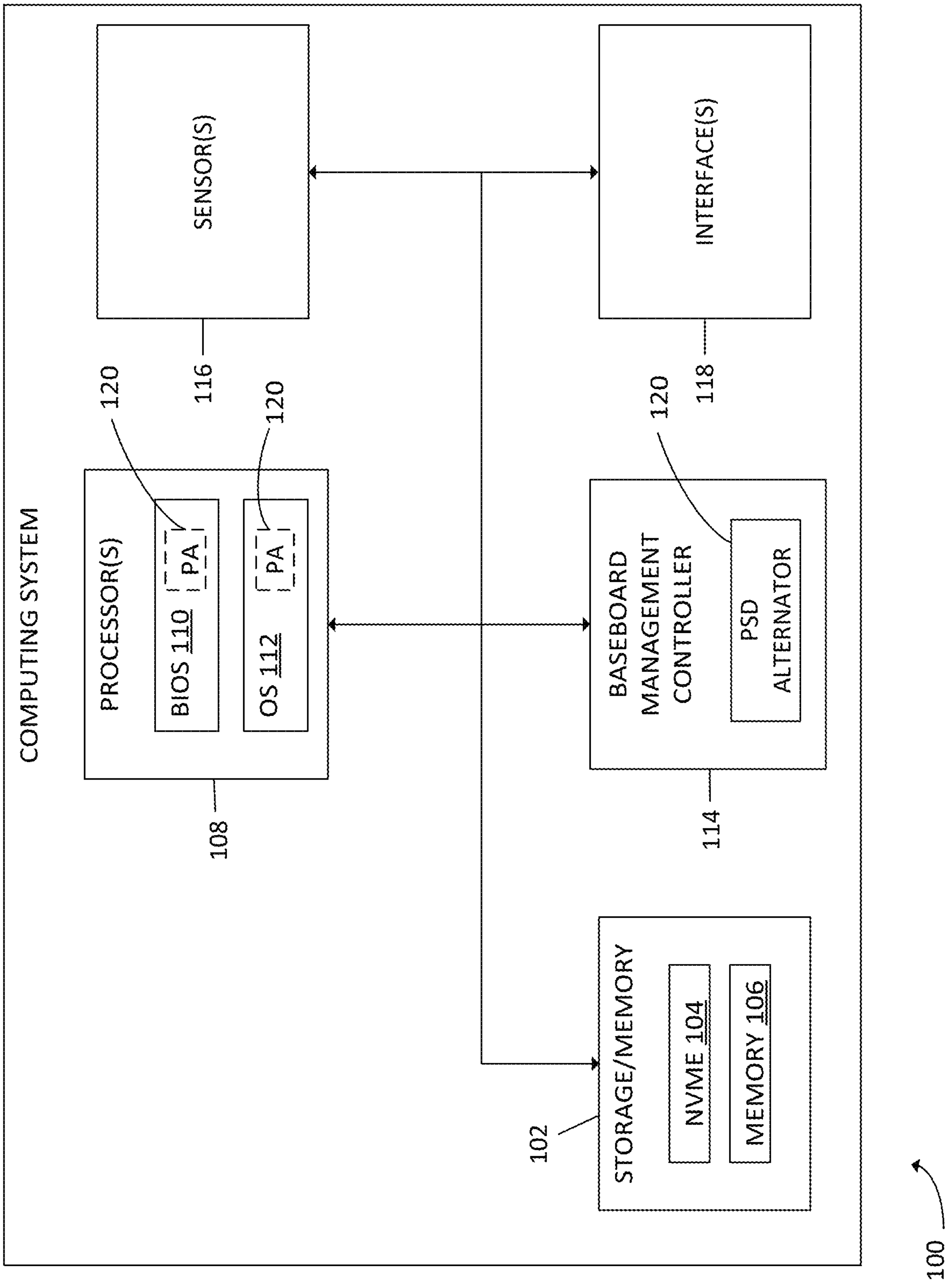
FIG. 1 is a block diagram illustrating a computing system that includes a memory device, in accordance with aspects of the present disclosure.

FIG. 1 is a diagram, illustrating a computing system 100 that includes storage/memory 102. The computing system 100 may include any suitable computing devices that may utilize data memory and/or storage, such as servers, desktop computers, laptop computers, tablet computers, cellular devices, wearable devices, and/or other computing devices. The storage/memory 102 may include any suitable articles of manufacture suitable for storing data and/or executable instructions. The storage/memory 102 includes a storage device, such as a Non-Volatile Memory Express (NVMe) device 104, a hard disk drive (HDD), a solid-state drive (SSD), an optical drive, another type of storage device, flash memory, read-only memory (ROM), or any combination thereof. The storage/memory 102 includes memory 106 that may include any suitable memory devices, such as a double data rate type 5(DDR5 ) synchronous dynamic random-access memory (SDRAM), double data rate type 4(DDR4 ) SDRAM, low-power double data rate (LPDDR) SDRAM, another suitable type of memory device, or any combination thereof.

The computing system 100 also includes one or more processors 108. The one or more processors 108 may include one or more processing resources, such as a central processing unit (CPU), a graphics processing unit (GPU), implemented using a field programmable gate array (FPGA), or a combination thereof. The one or more processors 108 may be operably coupled with the storage/memory 102 to facilitate the use of the one or more processors 108 to implement various stored programs. Such programs or instructions executed by the one or more processors 108 may be stored in any suitable article of manufacture that includes one or more non-transitory and computer-readable media at least collectively storing the instructions or routines, such as the NVMe 104, the memory 106, and/or other portions of the storage/memory 102.

Programs encoded on such a computer program product of the articles of manufacture may also include instructions that may be executed by the one or more processors 108 to enable the computing system 100 to provide various functionalities. For instance, the programs implemented by the one or more processors 108 using the instructions stored on the non-transitory, computer-readable medium of the storage/memory 102 may include a Basic Input/Output System (BIOS) 110 and an operating system (OS) 112. The BIOS 110 starts up the computing system 100 and performs a Power-On Self-Test (POST) to check that all devices (e.g., one or more interfaces 118) connected to the one or more processors 108 are functioning properly. The BIOS 110 also provides instructions for controlling and interacting with hardware components (e.g., keyboard, displays, the storage/memory 102, etc.) and configuring the system while also managing security. As part of these operations, the BIOS 110 loads the OS 112 into the one or more processors 108 upon startup of the computing system 100. The OS 112, once loaded into the one or more processors 108 by the BIOS 110, manages all other application programs and manages device hardware (e.g., the storage/memory 102) and software resources.

In some of implementations of the computing system 100, the computing system 100 also includes a baseboard management controller (BMC) 114. The BMC 114 enables remote management of the computing system 100. The BMC 114 may share a baseboard with at least one of the one or more processors 108. The BMC 114 is a specialized service processor that remotely monitors the physical state of the computing system 100. For instance, such implementations may be suitable when the computing system 100 includes a network-connected desktop computer/workstation, a network server, and/or other network-connected hardware device.

The BMC 114 uses one or more sensors 116 to perform hardware monitoring. For instance, the one or more sensors 116 may include sensors that measure internal and/or external physical variables, such as temperature, humidity, power supply voltage, fan speeds, communications parameters, other variables, or any combination of these variables. When one of these variables crosses a threshold outside of specified limits, the BMC 114 may instruct the one or more processors 108 and/or other hardware to make a remedial action to correct for operation outside of the specified limits. For instance, the BMC 114 may instruct the one or more processors 108 to turn off and/or reboot the computing system 100, adjust operation to reduce thermal generation by reducing at least one performance characteristic, flash the BIOS 110, and/or any other remedial actions that may be appropriate based on measurements from the one or more sensors 116. In some situations, the BMC 114 may raise an alarm, log an event, and/or send an alert to a system administrator when such remedial actions are to be taken.

The computing system 100 also includes one or more interfaces 118 that enable other remote devices and/or a user to interact with the computing system 100. The one or more interfaces 118 may include, for example, one or more network interfaces for a personal area network (PAN), such as a Bluetooth network, for a local area network (LAN) or wireless local area network (WLAN), such as an IEEE 802.11x Wi-Fi network, an IEEE 802.15.4 wireless network, an Ethernet network, and/or for a wide area network (WAN), such as a cellular network. The one or more interfaces 118 may additionally or alternatively include one or more interfaces for, for example, broadband fixed wireless access networks (WiMAX), mobile broadband Wireless networks (mobile WiMAX), and so forth.

The one or more interfaces 118, in combination with a display, may enable a user to control the computing system 100. For example, the one or more interfaces 118 may enable a remote device, a user, and/or the BMC 114 to control operation of one or more components of the computing system 100. The one or more interfaces 118 may have an input-output (IO) interface, such as a Universal Serial Bus (USB) interface, a coaxial cable interface, or a combination thereof. The one or more interfaces 118 may enable connection of a keyboard and/or mouse, a microphone that may obtain a user's voice for various voice-related features, and/or a speaker that may enable audio playback. At least one of the one or more interfaces 118 may be used by the BMC 114 to enable remote management. For instance, the BMC 114 may use an interface corresponding to an Integrated Lights-Out (iLO) or other remote management interfaces to provide an interface to remotely manage the computing system 100.

The BMC 114, the BIOS 110, and/or the OS 112 may implement a PSD alternator (PA) 120. The PA 120 may include software and/or hardware that alternates the NVMe device 104 between power states by selecting two or more PSDs and alternating between power states corresponding to the PSDs to keep a performance metric within a threshold of a target value. The PA 120 selects a first PSD above the target value for the performance metric and a second PSD below the target value for the performance metric. The performance metric may be any metric reflective of performance of the NVMe device 104. For instance, the performance metric 302 may correspond to thermal energy production, throughput, frequency, power consumption, latency, any metric stored in an entry of the PSD, an advanced metric that is a combination of other metrics, and/or any of parameters indicated in a PSD.

To determine how long to apply each power state, the PA 120 may determine how far the two or more PSDs are from the target value. For instance, if the target value is a particular value (e.g., 4), the PA 120 may select a first PSD with a corresponding value above (e.g., 4.7) and a second PSD with a corresponding value below (e.g., 2.3) the target value. The PA 120 may determine the distance between the first PSD and the target (e.g., 0.7) and between the second PSD and the target (e.g., 1.7). The PA 120 then uses these distances to determine a first duration to use the first active state corresponding to the first PSD and a second duration to use the second active state to average out within a threshold of the target value. For instance, when the first distance is greater than the second distance, the PA 120 determines that the second duration is to be greater than the first duration by a same ratio as the first distance is greater than the second distance.

Figure 2:
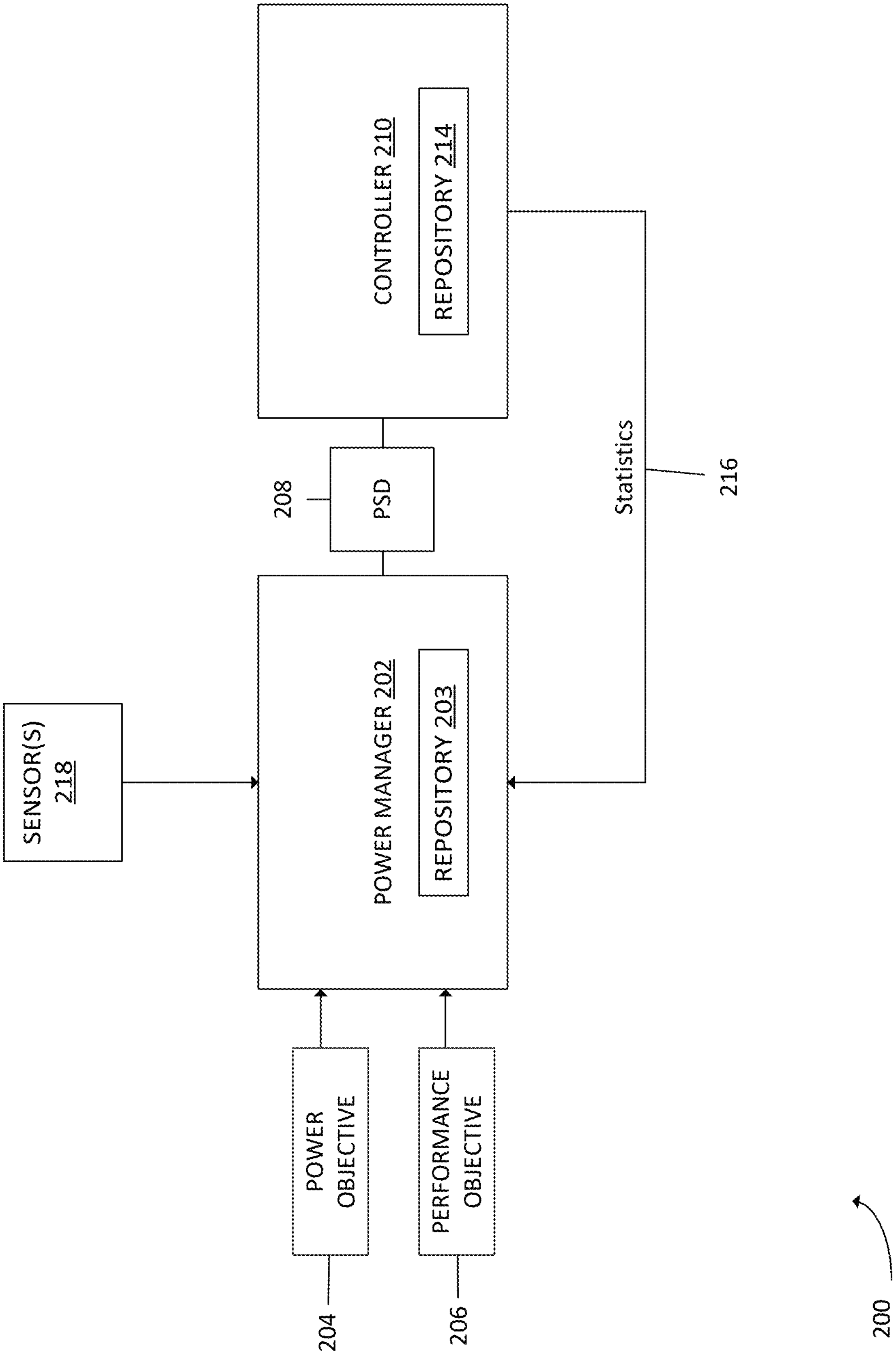
FIG. 2 is a block diagram of a power control scheme for the memory device of FIG. 1, in accordance with aspects of the present disclosure.

FIG. 2 is a block diagram of an example of an NVMe process 200 that may be implemented to manage power on any NVMe device, such as the NVMe device 104. The NVMe device uses an NVMe architecture that defines features for how one or more processors, such as the one or more processors 108 and/or the BMC 114, of the NVMe device may manage the power consumption for the NVMe device. Specifically, as illustrated, the process 200 utilizes a power manager 202 that may throttle an SSD of the NVMe device to a specific target (i.e., thermal design power level) to manage platform thermals and/or the total power draw. The power manager 202 may be software implemented in one or more processors of the NVMe device to implement PSD alternation between two or more power states, such as implementing the PA 120. Thus, any steps discussed as performed by the power manager 202 may be implemented using instructions stored in corresponding memory, such as the storage/memory 102, and executed in the one or more processors. For instance, the power manager 202 may be included as part of a BIOS, such as the BIOS 110 of FIG. 1, and/or part of an OS, such as the OS 112 of FIG. 1. Additionally or alternatively, the power manager 202 may be implemented as part of other software running on the one or more processors of the NVMe device.

The power manager 202 may change active power states of the NVMe device. A maximum power draw may be defined for a form factor, such as U.2, M.2, or Enterprise and Data Center Standard Form Factor (EDSFF). However, within those form factors, the power manager 202 can change an active power state of the NVMe device to increase power and performance when a large amount of data is incoming and/or to decrease power to meet thermal or performance goals even if SSD performance is reduced. The power manager 202 may include a repository 203 where all of the available power states are stored. For instance, the power states may include one or more active power states, one or more low power/idle states, one or more sleep states where volatile memory is kept fresh, one or more hibernate states where a system state is saved to be resumed after waking, and/or one or more partial or completely off states. In other words, the power states may include non-operational and/or partially operational power states that may be used to improve battery life by using no power or a low level of power when the drive is idle. For instance, the NVMe device may take advantage of low power modes or a Peripheral Component Interface Express (PCIe) or other bus standard types to reduce power consumption.

The power manager 202 receives a power objective 204 and/or a performance objective 206. For instance, the power objective 204 and/or the performance objective 206 may be specified by a user, specified by vendor for the NVMe device, specified by the BIOS, specified by the OS, specified by instructions executed in a BMC, specified in a command from a remote processor received at the BMC, specified in firmware for the NVMe device, and/or any other suitable mechanism for specifying objectives. For instance, the power objective 204 and/or the performance objective 206 may be based on a mode set for the computing system that includes the power manager. For instance, the OS, the BIOS, and/or a BMC of the computing system may select between a high-performance mode, a power savings mode, and/or a hybrid mode that balances power and performance. The selection may be manual via the OS, the BIOS, the BMC, or remote processor(s), or may be set based on conditions. For instance, if the computing system is a device that operates off battery power or off AC line power, the power savings mode may be enabled when AC line power is unavailable and/or when an amount of charge in the batteries falls below a threshold (e.g., 20%) of available charge.

The power objective 204 may specify one or more power thresholds within which the NVMe device and/or its overall computing system of which it is a part (e.g., the computing system 100) is to operate. The performance objective 206 may specify one or more performance thresholds within which the NVMe device and/or the overall computing system is to operate.

Based on the power objective 204 and/or the performance objective 206, the power manager 202 selects a power state from the repository 203 and sends a corresponding power state descriptor (PSD) 208 to a controller 210 of the NVMe device 104 to cause operations of the NVMe device 104 to be performed using parameters that correspond to the PSD 208. For instance, the repository 203 may store targets (e.g., how much power is permitted to be used) for NVMe operation based on a state of the computing system. The power manager 202 selects one or more states that satisfy that permitted amount of power. These power states may be stored in the repository 203 as PSDs that indicate the power states with their respective various performance metrics. The power manager may select the states and PSDs that most closely match the targets.

The controller 210 may be a hardware controller for the NVMe device and/or may be at least partially implemented in the one or more processors implementing the power manager 202. Each power state is associated with a PSD 208 that is stored in a repository 214 of the controller 210. For instance, the repository 214 may be in the unique Identify Controller data structure of the controller 210 as defined by the NVMe specification. The PSDs 208 may be stored in the repository 214 as a table of values with an entry for each of the states.

Each entry may specify parameters, such as maximum power (MP) in Watts (W), an entry latency (ENLAT) in microseconds, an exit latency (EXLAT) in microseconds, relative read throughput (RRT), relative read latency (RRL), relative write throughput (RWT), and a relative write latency (RWL). ENLAT specifies how long it takes for an NVMe SSD to enter a low/idle power state while the computing system is active, but the SSD drive is idle. Likewise, EXLAT specifies how long it takes for the NVMe SSD to exit the low/idle power state to a full power state. RRT is a measure of the performance of a file system by comparing the read throughput of the device at the corresponding state relative to a full power state/full performance. RRL is a measure of the time it takes to retrieve data from a storage device in the corresponding state relative to full power state/full performance. RWT is a measure of the performance of a file system by comparing the write throughput of the device at the corresponding state relative to a full power state/full performance. RWL is a measure of the time it takes to write data to a storage device in the corresponding state relative to full power state/full performance. The number of power states supported by the controller 210 may be reported to the power manager 202 as part of statistics 216 that may include any information from the NVMe device to the power manager 202.

Using the defined information in the repository 214, the controller 210 decodes one or more parameters under which it controls operation of the NVMe device. Thus, the controller 210 uses the decoded parameters to manage operations of the NVMe device. During operation, the controller 210 may return one or more statistics 216 to the power manager 202. These statistics 216 may relate to actual measurements of operations, such as latencies and/or throughputs in numbers of clock cycles or in an amount of time. Additionally or alternatively, these statistics 216 may indicate the specified latencies, throughputs, and/or other parameters that may correspond to an entry in the repository 214 that corresponds to the PSD 208 received from the power manager 202. The power manager 202 may utilize one or more sensors 218 to track operation of the NVMe device and/or the computing system overall. For instance, the one or more sensors 218 may include any of the sensor types discussed in relation to the one or more sensors 116 of FIG. 1. In some implementations, the controller 210 may interface with at least one of the sensors 218 to control operations directly and/or return such measured values as part of the statistics 216.

Figure 3A:
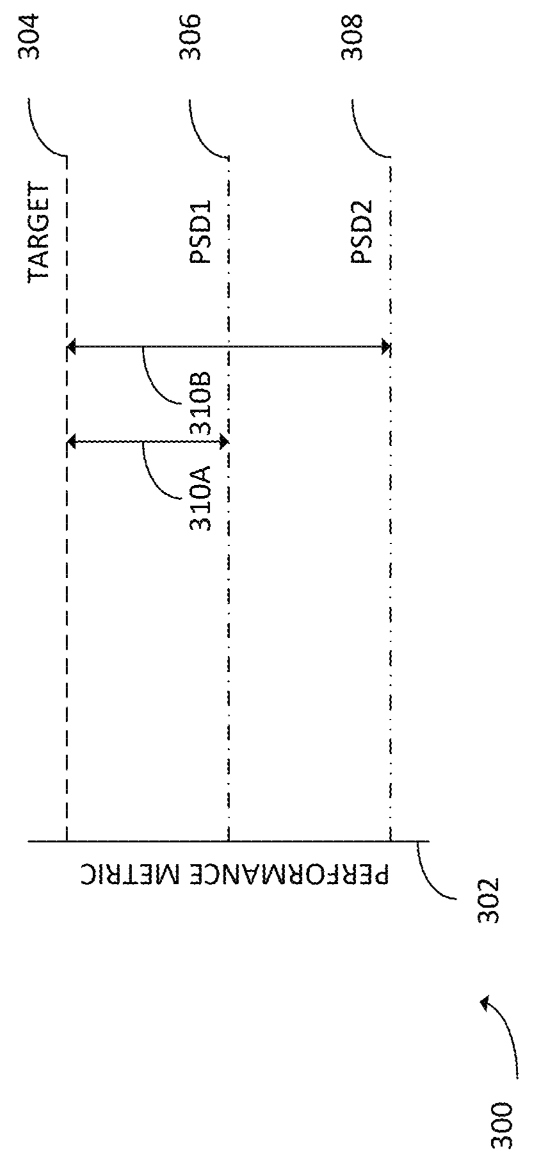
FIG. 3A is a graph of two power state descriptors below a performance target using a performance metric for comparison, in accordance with aspects of the present disclosure.

FIG. 3A is a graph 300 of different performance levels plotted on a performance metric 302. The performance metric 302 may be any metric reflective of performance of an NVMe device, such as the NVMe device 104. For instance, the performance metric 302 may correspond to thermal energy production, throughput, frequency, power consumption, latency, an advanced metric that is a combination of other metrics, and/or any of parameters indicated in a PSD, such as those discussed above in relation to the PSD 208. The higher on the axis of the performance metric 302, the higher the performance (and power draw) of the NVMe device. Furthermore, when the performance metric is any metric other than thermal energy production, the performance metric may have a positive proportional relationship between the thermal energy production and the performance metric. In other words, the higher the performance metric (e.g., frequency) would generally result in a higher thermal energy production even if the performance metric is some metric other than thermal energy production. The graph 300 may be a single dimension graph that shows different available performance levels. Alternatively, the graph 300 may be a two-dimensional graph that shows different PSDs used at different times with the horizontal axis corresponding to time.

In the graph 300, a target 304 corresponds to a sufficient thermal capability of the NVMe device to dissipate sufficient heat that the NVMe device generates at that performance target (e.g., a specific frequency or other performance metric). The graph 300 also shows a first PSD (PSD1) 306 and a second PSD (PSD2) 308. The PSD1 306 and the PSD2 308 may be different descriptors corresponding to different power states for the same NVMe device or may each correspond to a different NVMe device (e.g., different vendors).

Since the selected available power state should not exceed the thermal capability of the NVMe device and/or its overall computing system, a power manager (e.g., the power manager 202) selects the closest available PSD (e.g., PSD1 306) that is below the target 304. Between the target 304 and the closest PSD (e.g., PSD1 306), there is a performance gap 310A in real world implementations. Furthermore, the mixed vendors of the MV-sku strategy may have different presets so that shipped drives may have different sized performance gaps between the different drives based on different vendors used. For instance, on the different NVMe device using a different vendor having the PSD2 308 as its closest PSD, the corresponding performance gap 310B is larger than using the PSD1 306.

Figure 3B:
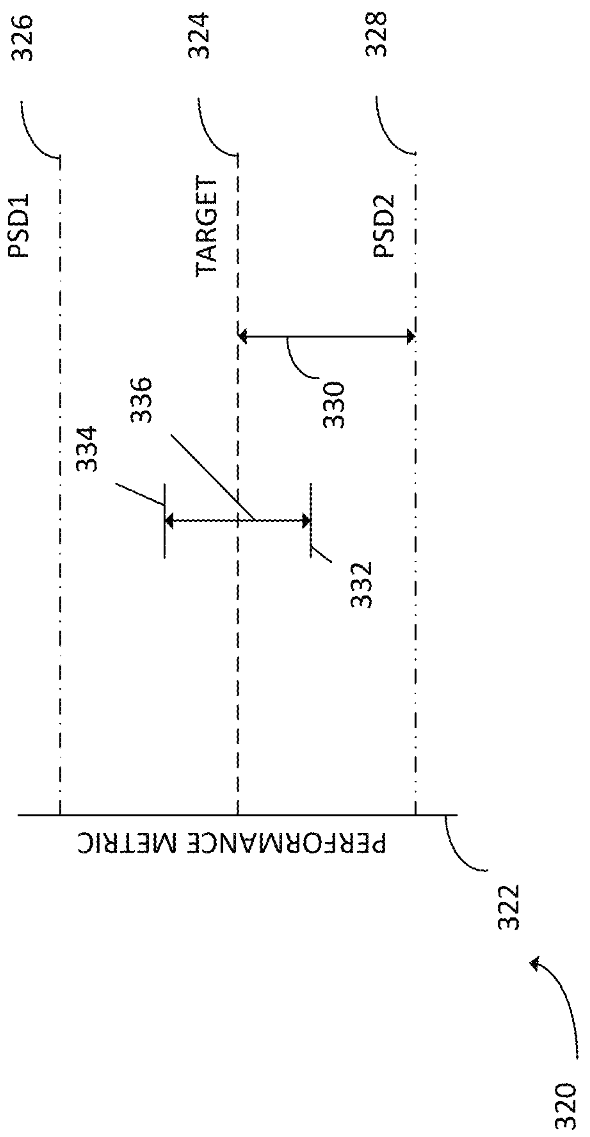
FIG. 3B is a graph of two power state descriptors with a performance target between the power state descriptors using a performance metric for comparison, in accordance with aspects of the present disclosure.

FIG. 3B is a graph 320 of different performance levels plotted on a performance metric 322. The performance metric 322 may be any metric reflective of performance of the NVMe device and may include any of the metrics discussed in relation to the performance metric 302. For instance, the performance metric 322 may correspond to thermal energy production, throughput, power consumption, frequency, latency, an advanced metric that is a combination of other metrics, and/or any of parameters indicated in a PSD, such as those discussed above in relation to the PSD 208. The higher on the axis of the performance metric 302, the higher the performance (and power draw) of the NVMe device. Furthermore, when the performance metric is any metric other than thermal energy production, the performance metric may have a positive proportional relationship between the thermal energy production and the performance metric. In other words, the higher the performance metric (e.g., frequency) would generally result in a higher thermal energy production even if the performance metric is some metric other than thermal energy production. The graph 300 may be a single dimension graph that shows different available performance levels. Alternatively, the graph 300 may be a two-dimensional graph that shows different PSDs used at different times with the horizontal axis corresponding to time.

In the graph 320, a target 324 corresponds to a sufficient thermal capability of the NVMe device to dissipate sufficient heat that the NVMe device generates at that performance target (e.g., a specific frequency or other performance metric). The graph 320 also shows a first PSD (PSD1) 326 and a second PSD (PSD2) 328. The PSD1 326 and the PSD2 328 may be different descriptors for different power states of the same NVMe device or of different NVMe devices.

Since there is only a single PSD (e.g., PSD2 328) below (i.e., less efficient than) the target 324 according to the metric, it may be selected by the power manager for use in operation of the NVMe device. However, the issue with the performance gap 330 may persist in real world implementations. To overcome this performance gap 330, the power manager may alternate between a PSD (e.g., PSD2 328) below the target 324 and a PSD (e.g., PSD1 326) above the target.

The duty cycle between the PSD1 326 and the PSD2 328 may be limited to prevent overheating of the NVMe device and/or its computing system. Furthermore, the duty cycle between the PSD1 326 and the PSD2 328 may enable the performance of the NVMe device 104 to remain between a lower bound 332 and an upper bound 334 to operate within a threshold 336 of the target 324. In some implementations, the upper bound 334 may be capped at the target 324 while other implementations allow the upper bound 334 to exceed the target 324 for at least some period of time. For instance, the threshold 336 may be entirely below/at the target 324 but closer to the target than the performance gap 330. Regardless of where the threshold 336 is relative to the target 324, the average performance and/or thermal condition of the NVMe device may remain around (i.e., within the threshold 336) of the target 324.

Figure 4:
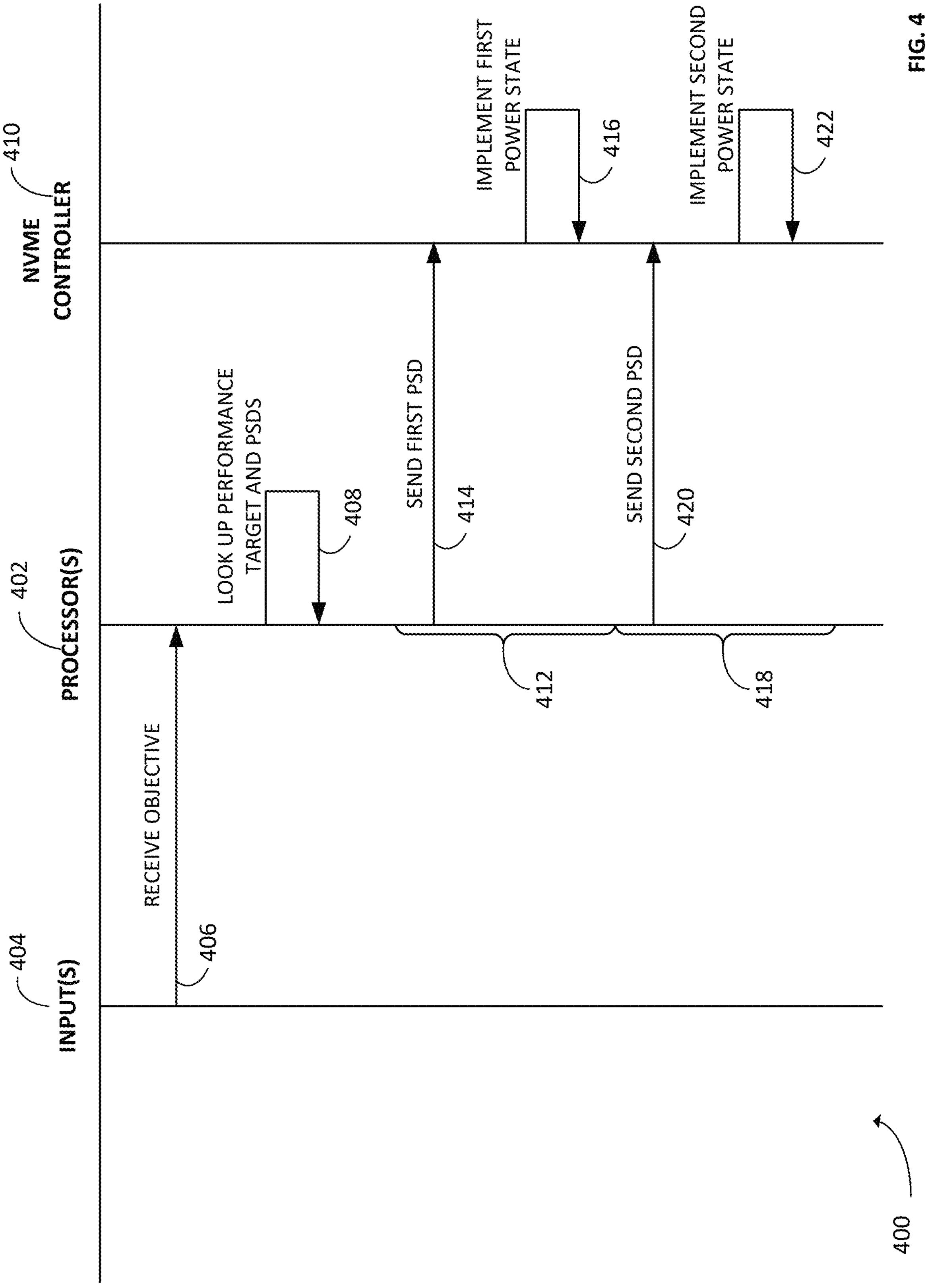
FIG. 4 is a flow diagram illustrating a process for operating the memory device of FIG. 1 within a threshold of the target of FIG. 3B by alternating between the power state descriptors of FIG. 3B, in accordance with aspects of the present disclosure.

FIG. 4 is a flow diagram of a process 400 that may be deployed by a power manager in one or more processors 402 of a computing system that includes an NVMe device. The one or more processor(s) 402 may be a processor (e.g., central processor) of the computing system that executes instructions to implement an OS and/or a BIOS for the computing system. Additionally or alternatively, the processor(s) 402 may include a BMC for the computing system.

In the illustrated process 400, a power manager, such as the power manager 202, may be implemented in the one or more processor(s) 402. The processor(s) 402 may couple to one or more input(s) 404 that the processor(s) 402 use to receive an objective 406. The objective may include a set mode or one or more conditions that sets a particular performance or power objective indicating a target amount of power or a performance level to be achieved for the computing system. For instance, the objective may include a setting in memory or firmware indicating that a high-performance mode is enabled, a power saving mode is enabled, or a target power consumption using values indicated in firmware and/or memory. Additionally or alternatively, the objective may indicate power or performance objectives based on conditions of the computing system. For instance, the objective may indicate a lower power state when operating on battery power and a higher power state when operating using AC line power. Moreover, these conditions may be supplemented by or replaced with manual setting of a power mode using input devices (e.g., interface (s) 118).

The input(s) 404 may be any mechanism that may be used to store the objective or transmit the objective to the processor(s) 402. As such, the input(s) 404 may include memory that may store an indication of which power state (e.g., low, high, higher, etc.) to use based on conditions (e.g., AC line power versus battery power) or set modes (e.g., manually set mode). In implementations where the processor(s) 402 include a BMC, the input(s) 404 may include remote processor(s) that control operation of the computing system remotely. Furthermore, these input(s) 404 may include interface devices (e.g., interface(s) 118) that may be used to change these stored values. The processor(s) 402 may receive the objective in instructions corresponding to firmware, BIOS, OS, BMC instructions, and/or any other programs implemented in the one or more processor(s) 402.

In response to receiving the objective, the processor(s) 402 look up a performance target and available PSDs 408. For instance, the processor(s) 402 may access a repository (e.g., the repository 203) that stores available power states for an NVMe device. The repository may store PSDs that are indexed by performance metrics since, as noted previously, the PSDs store corresponding values for metrics (e.g., max power, latencies, etc.). The objective may correspond to a value or limit for a performance metric (e.g., frequency, temperature, etc.) with the processor(s) 402 matching the objective-based target value with the values of the PSDs.

As part of the look up, the processor(s) 402 select two or more PSDs that are above and below the target value. In some implementations, these PSDs are retrieved at the same time while other implementations may select one PSD (e.g., the PSD below the performance metric) initially at one time and selecting the other PSD(s) at a later time. In some implementations, as part of the selection of the two or more PSDs, the processor(s) 402 determine a duty cycle between the two or more PSDs. In other words, the processor(s) 402 determine how long to operate in each of the respective power states. As discussed below, the ratio of time that the memory device operates in each of the power states may be proportional to the distance of the PSDs from the target value. For example, the ratio of the time for each state may be inverse to the ratio of the distances of the corresponding PSDs from the target value.

During a first period 412, the power manager 202 implemented in the one or more processor(s) 402 operates the memory device for in a first power state using a first power state descriptor for the memory device. The first power state descriptor is lower than a performance target corresponding to the objective. As such, the first power state descriptor is lower than the performance target in at least one performance metric, such as the performance metric 302 in FIG. 3A or the performance metric 322 in FIG. 3B. As part of operating the memory device, the processor(s) 402 send the first power state descriptor as a selected PSD 414 to an NVMe controller 410 of the memory device.

In response to the first PSD 414, the NVMe controller 410 implements the first power state 416 by looking up the corresponding operating parameters in its own repository (e.g., the repository 214). By setting the operating parameters of the memory device via the NVMe controller 410, the power manager operates the memory device using the first power state for the first period.

During a second period 418 following the first period 412, the power manager operates the memory device within a threshold of the performance target by switching from the first power state to a second power state for the memory device. As part of this operation, the power manager sends a second PSD 420 as the selected PSD to the NVMe controller 410. The second power state descriptor is higher than the performance target value in the performance metric.

In response to the second PSD 420, the NVMe controller 410 implements the second power state 422 by looking up the corresponding operating parameters in its own repository (e.g., the repository 214). By setting the operating parameters of the memory device via the NVMe controller 410, the power manager operates the memory device using the second power state for the second period following the first period.

In the illustrated implementation, the processor(s) 402 may send the first PSD and the second PSD at different times such that the corresponding PSDs are sent to cause the NVMe controller 410 to switch between the first and second power states. In some implementations, the processor(s) 402 may control such switching by way of timing when the PSDs are sent. Additionally or alternatively, the processor(s) 402 may send the durations of the first period 412 and the second period 418 to the NVMe controller 410 to cause the NVMe controller 410 to alternate between the first and second power states after the durations elapse. For instance, the first PSD and the second PSD may be sent at the same time or at substantially the same time with indications of how long each respective power state is to be active before switching to the other power state. As used herein, the first PSD and the second PSD being sent at substantially the same time is defined as the second PSD being sent to the NVMe controller 410 after the first PSD is sent but before the first power state is implemented in the NVMe device.

Although the foregoing discusses operating first using a first power state that corresponds to a setting that is below a target value first and then using a second power state that corresponds to a setting that is above the target value second, such orders may be reverse in some implementations. For instance, in such implementations, the first power state used may have a higher value in a performance metric (e.g., frequency or latency) than a target value for that performance metric based on the objective. After some period of time operating in the first power state, the power manager may switch the memory device to a second power state that has a lower value in the performance metric.

As previously mentioned and as further discussed below, as part of determining when to use the first power state descriptor and when to use the second power state descriptor, the power manager 202 (or other part of the one or more processors 108 and/or the BMC 114) determines a first distance between the first power state descriptor and the performance target and determines a second distance between the second power state descriptor and the performance target. The first period of time using the first power state descriptor and the second period of time using the second power state descriptors are proportional in length to the second and first distances.

Figure 5:
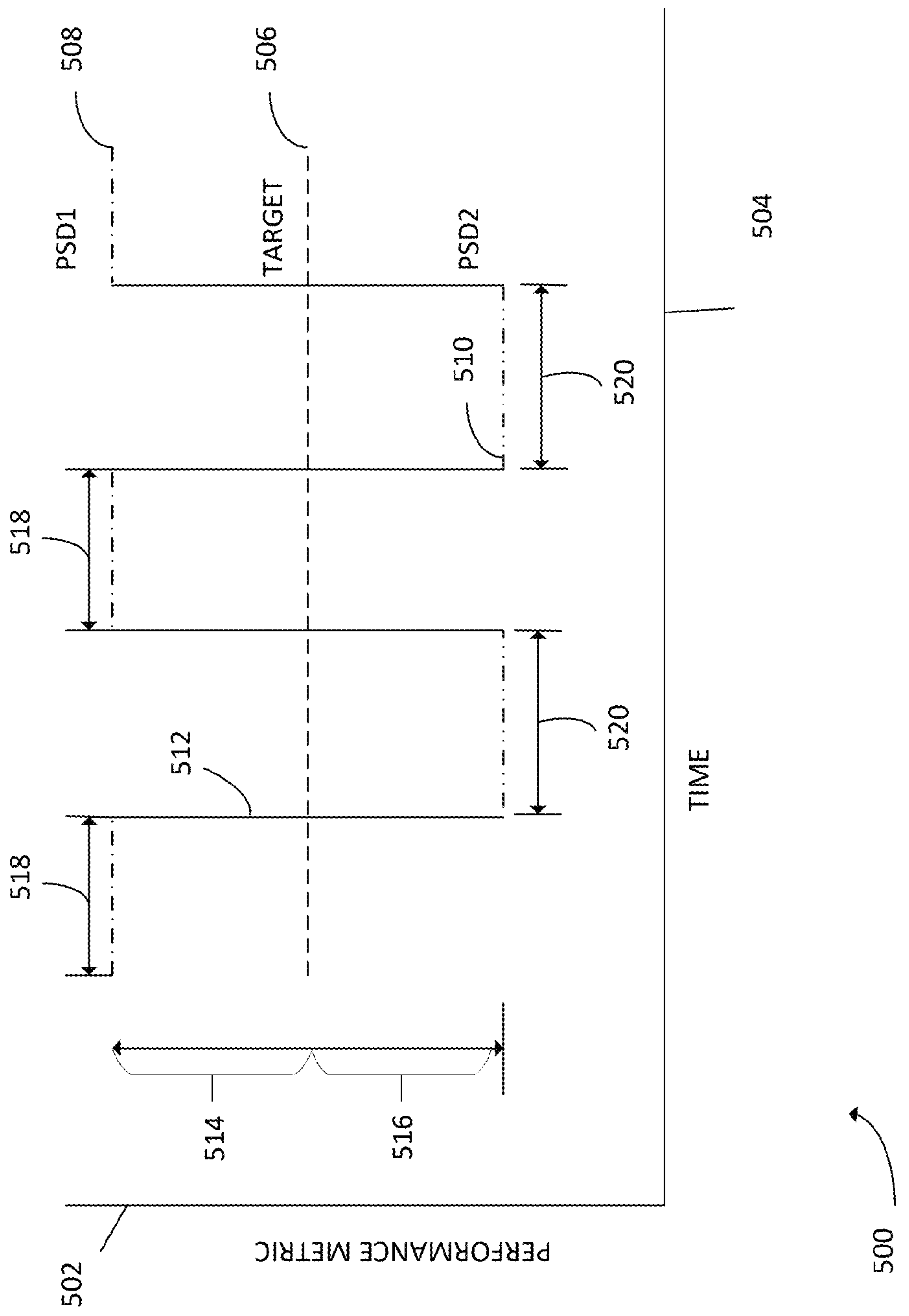
FIG. 5 is a graph illustrating the alternation between the power state descriptors in FIG. 4, in accordance with aspects of the present disclosure.

FIG. 5 is a graph 500 of state levels and target levels for a memory device using a performance metric 502 over time 504. The performance metric 502 may be similar to any of the performance metrics discussed above in relation to the performance metrics 302 and 322. The graph 500 shows a target 506 for operation of the an NVMe device (e.g., the NVMe device 104). The target 506 may be a selected value corresponding to a value of the performance metric 502 that corresponds to a corresponding goal, such as thermal energy created, power consumed, and/or any other performance goals for the NVMe device and/or its overall computing system that satisfies a maximum or minimum value. The graph 500 also includes a first power state descriptor (PSD1) 508 that corresponds to a power state for the NVMe device that is higher than the target 506 when comparing the values of the performance metric 502 of the PSD1 508 to that of the target 506. The graph 500 further includes a second power state descriptor (PSD2) 510 that corresponds to a power state for the NVMe device that is lower than the target 506 when comparing the performance metric 502 of the PSD1 508 to that of the target 506.

The graph 500 also shows a transition 512 between the PSD1 508 and the PSD2 510 where the power manager switches the NVMe device between the PSD1 508 and the PSD2 510. The power manager is implemented in processor(s) (e.g., processor(s) 402) of a computing system that includes the NVMe device. Furthermore, in certain implementations, the power manager may alternate between more than two PSDs in a manner consistent with the teachings herein. The graph shows a first distance 514 between the PSD1 508 and the target 506 and a second distance 516 between the PSD2 510 and the target 506 using the performance metric 502 as a measurement scale. The power manager and/or other software or hardware of the computing system may determine these distances by comparing parameters in the PSD1 508, the PSD2 510, and the target 506 to determine their respective values in the performance metric 502. Additionally or alternatively, the power manager 202 may use measurements from one or more sensors, such as the sensors 218, to measure the performance metric 502 when in the respective power states. For instance, the sensors may measure temperature, latencies, power consumed, a voltage level, a current level, or any combination thereof. The power manager may then compare the indicated levels in the PSD1 508 and the PSD2 510 to real world measurements to determine the first distance 514 and/or the second distance 516.

The power manager operates the NVMe device in the PSD1 508 during a first period of time 518 by sending the PSD1 508 to the controller of the NVMe device as instructions on how to behave during operations of the NVMe device by setting one or more parameters of such operations. During a second period of time 520, the power manager operates the NVMe device 104 in the PSD2 510 by sending the PSD2 510 to the controller of the NVMe device as instructions on how to behave during operations of the NVMe device by setting one or more parameters of such operations.

The power manager may set these durations according to a proportion of the first distance 514 to the second distance 516. For instance, when the first distance 514 is twice as long as the second distance 516, the first period of time 518 may have a duration that is half the length of the second period of time 520. In other words, the longer that the first distance 514 is in relation to the second distance 516, the longer that the second period of time 520 is in relation to the first period of time 518. As such, the first distance 514 divided by the second distance 516 may be equal to the duration of the second period of time 520 divided by the first period of time 518 to cause the average of the performance metric 502 to average to the value of the target 506 over time. For instance, in each cycle of one of the first periods of time 518 and of one of the second periods of time 520, the average of the performance metric 502 will be at or near the target 506.

Figure 6:
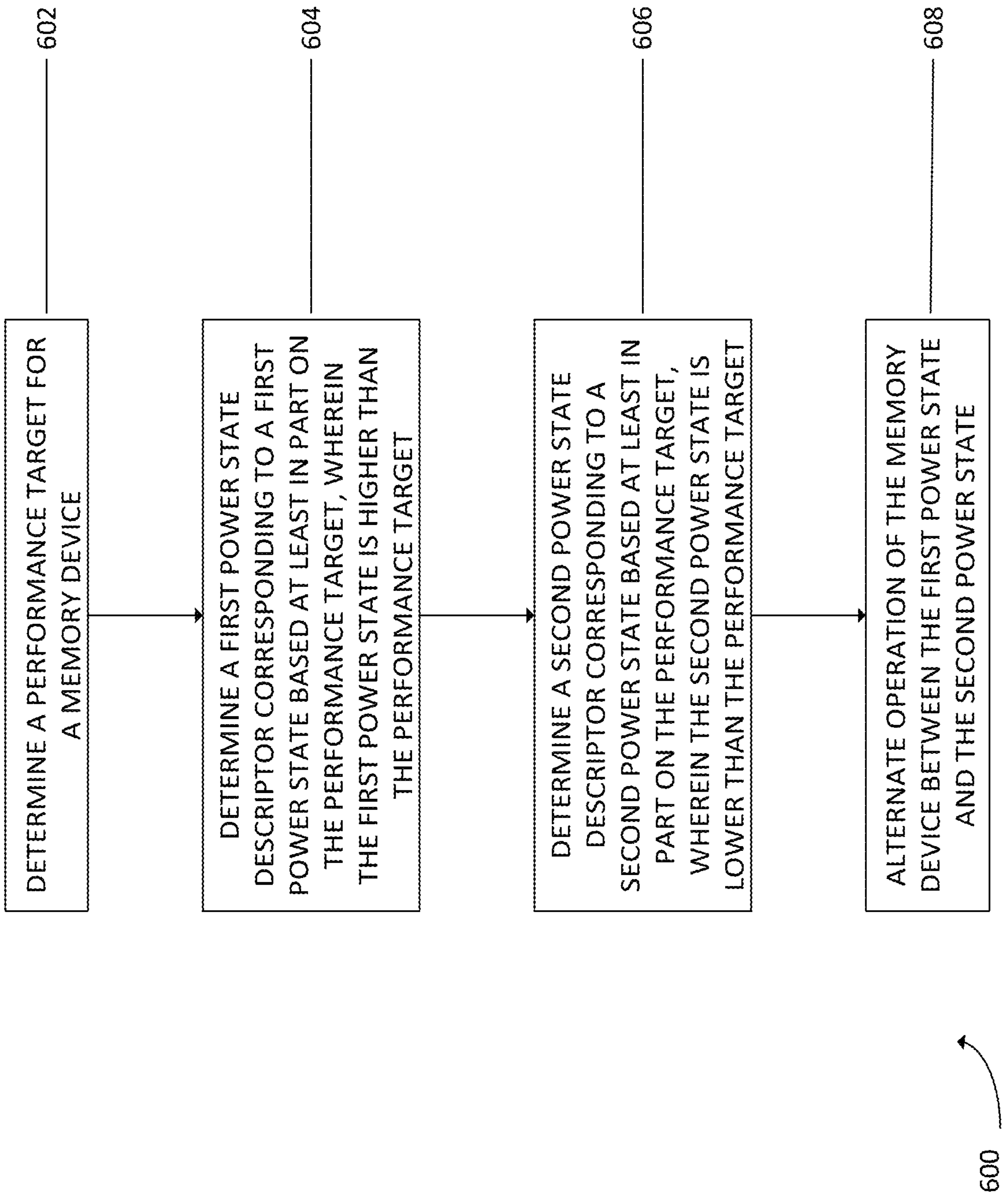
FIG. 6 is a flow diagram, illustrating a process for operating the memory device of FIG. 1 by alternating between the power state descriptors of FIG. 3B, in accordance with aspects of the present disclosure.

FIG. 6 is a flow diagram of a process 600 that may be implemented using a power manager. The power manager may be implemented using one or more processors (e.g., the processor(s) 108 or 402, a BMC (e.g., the BMC 114 or the processor(s) 402), and/or another processing resource of a computing system that includes the NVMe device. The process 600 includes the power manager determining a performance target for a memory device (block 602). For instance, the power manager may utilize an objective, such as the power objective 204 and/or a performance objective 206, to determine a target by looking up a target value in a table (e.g., repository 203) of the computing system. The target may correspond to a performance metric (e.g., power consumed, frequency, voltage, current, latency, etc.) that is within a thermal capability of the NVMe device, as indicated in the table.

The power manager also determines a first power state descriptor (PSD) corresponding to a first power state based at least in part on the performance target (block 604). The first PSD is higher than the performance target. For instance, as part of its definition, the first PSD specifies a parameter that is higher than the performance target in at least one performance metric (e.g., frequency, temperature, power consumption, latency, current used, etc.).

The power manager also determines a second PSD corresponding to a second power state based at least in part on the performance target (block 606). The second PSD is lower than the performance target. For instance, as part of its definition, the second PSD specifies a parameter that is lower than the performance target in at least one performance metric (e.g., frequency, temperature, current used, power consumption, latency, etc.).

The power manager then has the NVMe device alternate between the first power state and the second power state (block 608). For instance, the power manager sends multiple PSDs to the NVMe controller with corresponding duty cycles to cause the NVMe device to switch between using the first power state in a first period and a second power state in a second period.

As previously discussed, the power manager may determine the proportion of time that the NVMe device operates in the first power state relative to the time that the NVMe device operates in the second power state. This proportion in time may be based on the difference between the first power state and the performance target using the performance metric and the difference between the second power state and the performance target using the performance metric. To determine this proportion, the power manager may determine a first distance between the performance metric value of the first power state and the performance metric value of the performance target and determine a second distance between the performance metric value of the second power state and the performance metric value of the performance target. In addition to or alternative to such determination being performed in the power manager, this determination may be performed as part of the BIOS 110, and/or part of the OS 112.

The determination of the distance may be based on corresponding values in the corresponding PSDs. For instance, the PSDs and the performance target may specify a power and/or current level that is used as the performance metric. The power manager determines a difference between the power and/or current level in the first PSD and the power and/or current level in the performance target as the first distance. The power manager determines another difference between the power and/or current level in the second PSD and the power and/or current level in the performance target as the second distance.

The ratio of the duration of the first period to the duration of the second period is proportional to the ratio of the second distance to the first distance. In other words, if the first distance is greater than the second distance, the second period is longer than the first period by a similar proportion and vice versa.

Figure 7:
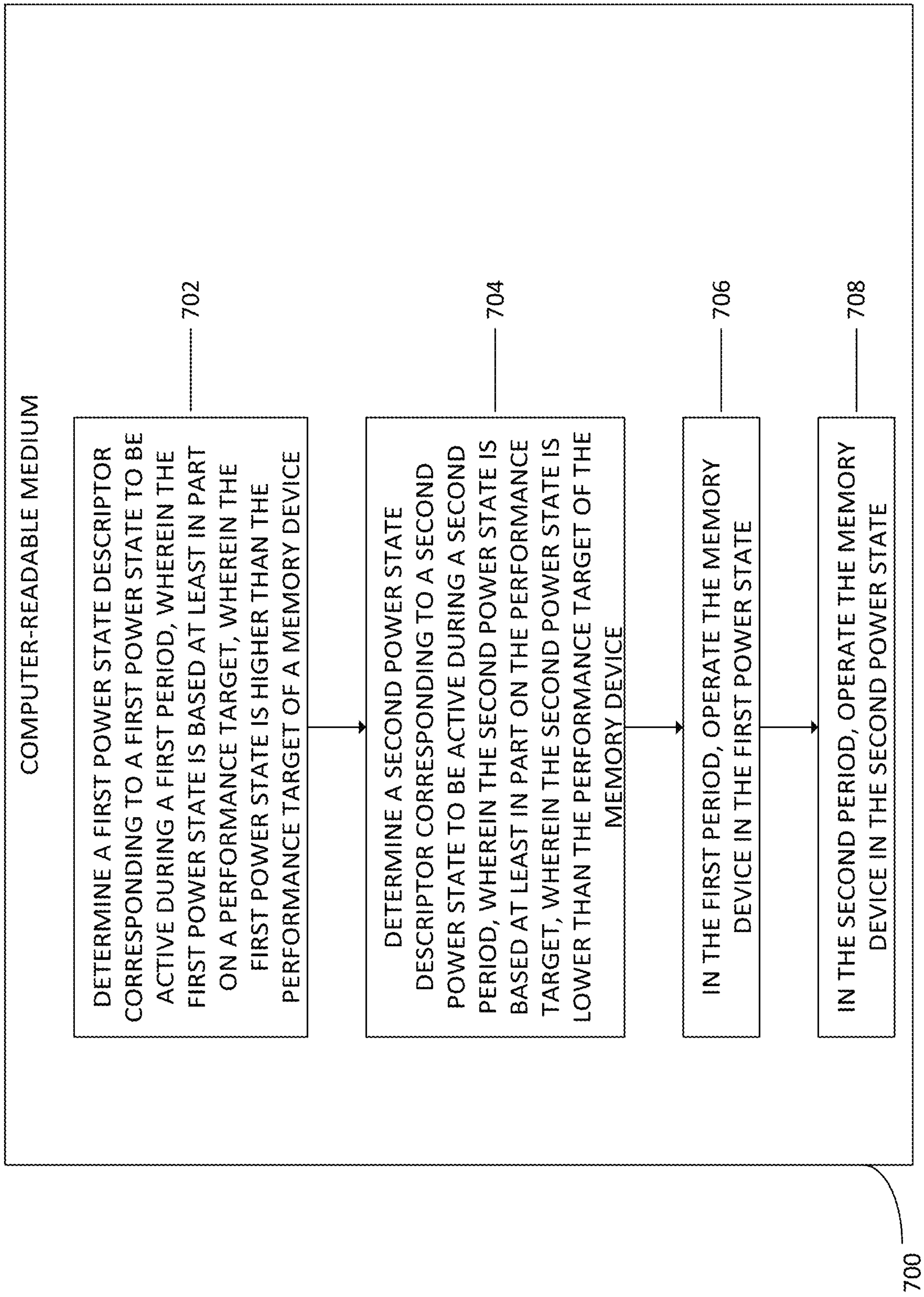
FIG. 7 is a flow diagram illustrating a computer-readable medium for operating the memory device of FIG. 1 by using the power state descriptors of FIG. 3B in different periods, in accordance with aspects of the present disclosure.

FIG. 7 is a flow diagram of computer-readable medium 700 that stores instructions that are executed using one or more processors, such as the one or more processors 108 or 402, the BMC 114, the controller 210 of the NVMe device 104, and/or another processing resource of the computing system 100. The computer-readable medium 700 is non-transitory and stores instructions implementable by the one or more processors. The instructions stored in the computer-readable medium 700 may be part of the power manager 202, the BIOS 110, the OS 112, and/or any other software executable by the one or more processors. The stored instructions may be used to determine and/or receive a performance target for a memory device, such as the NVMe device. For instance, the one or more processors may utilize a received objective, such as a power objective 204 and/or a performance objective 206, to determine a target value for a performance metric that matches the objective. For instance, such target values may be mapped to specific objectives that may be derived from looking up such objectives in the table. The target may correspond to a performance metric (e.g., power consumed, frequency, voltage, latency, current, etc.) that is within the thermal capability of the NVMe device.

The instructions cause the one or more processors to determine a first power state descriptor (PSD) corresponding to a first power state to be active during a first period, wherein the first power state is based at least in part on the performance target (block 702). The first PSD is higher than the performance target. For instance, in its definition, the first PSD specifies a parameter that is higher than the corresponding value of the performance target in at least one performance metric (e.g., frequency, temperature, power consumption, latency, current used, etc.).

The instructions also cause the one or more processors to determine a second PSD corresponding to a second power state to be active during a second period, wherein the second power state is based at least in part on the performance target (block 704). The second PSD is lower than the performance target. For instance, in its definition, the second PSD specifies a parameter that is lower than the performance target in the at least one performance metric (e.g., frequency, temperature, current used, latency, power consumption, etc.).

The instructions further cause the one or more processors to operate the memory device in the first power state during the first period (block 706). Operating the memory device in the first power state may include sending the first PSD to an NVMe controller along with an indication of the duration of the first period.

The one or more processors also operate the memory device in the second power state during the second period (block 708). Operating the memory device in the second power state may include sending the second PSD to the NVMe controller along with an indication of the duration of the second period. In other words, the instructions make the memory device alternate between the first power state and the second power state. For instance, the one or more processors may use the instructions to alternate PSDs to the NVMe controller to cause the NVMe device to switch between using the first power state in a first period and a second power state in a second period in a manner to maintain operation of the NVMe device within a threshold of a target value for the performance metric.

As previously discussed, the instructions may cause one or more processors to determine the proportion of time that the NVMe device operates in the first power state relative to the time that the NVMe device operates in the second power state. This proportion in time may be based on the difference between the first power state and the performance target using the performance metric and the difference between the second power state and the performance target using the performance metric. To determine this proportion, the one or more processors may use the instructions to determine a first distance between the performance metric value of the first power state and the performance metric value of the performance target and determine a second distance between the performance metric value of the second power state and the performance metric value of the performance target. The determination of the distance may be based on corresponding values in the corresponding PSDs. For instance, the PSDs and the performance target may specify a power and/or current level that is used as the performance metric. The one or more processors use the instructions to determine a difference between the power and/or current level in the first PSD and the power and/or current level in the performance target as the first distance. The one or more processors determines another difference between the power and/or current level in the second PSD and the power and/or current level in the performance target as the second distance.

The ratio of the duration of the first period to the duration of the second period is proportional to the ratio of the second distance to the first distance. In other words, if the first distance is greater than the second distance, the second period is longer than the first period by a similar proportion and vice versa.

As previously discussed, by alternating between PSDs, the NVMe device enables a fine-tuning mechanism that may be deployed by adjusting firmware and/or software for currently deployed NVMe devices. These adjustments also provide flexibility that averages performance/power consumption across multiple vendors to obtain consistent/improved performance across different vendors, such as for products using MV-sku strategies. Furthermore, the fine-tuning mechanism may enable the NVMe device to function closer to a target over time to reduce performance gaps between the available PSDs and the target values.

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions are made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

While certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:

a memory device; and a processor configured to:

select a first power state descriptor corresponding to a first level of a performance metric for the memory device above a performance target level of the performance metric;

select a second power state descriptor corresponding to a second level of the performance metric below the performance target level;

operate the memory device for a first period of time using the first power state descriptor for the memory device; and operate the memory device within a threshold of the performance target level by switching, based on expiration of the first period of time, from the first power state descriptor to the second power state descriptor for the memory device during a second period of time.

2. The system of claim 1, wherein the processor comprises a baseboard management controller (BMC) for a host device for the memory device.

3. The system of claim 1, wherein the memory device comprises a non-volatile memory express (NVMe).

4. The system of claim 3, wherein the processor is configured to:

determine a first difference between the first level corresponding to the first power state descriptor and the performance target level; and determine a second difference between the second level corresponding to the second power state descriptor and the performance target level.

5. The system of claim 4, wherein the first period of time is proportional in length to the second difference.

6. The system of claim 5, wherein the second period of time is proportional in length to the first difference.

7. The system of claim 1, wherein the processor comprises a central processing unit for a host device for the memory device that is configured to implement a basic input/output system (BIOS) for the host device and implement an operating system for the host device, and the processor is configured to switch from the first power state descriptor to the second power state descriptor by the BIOS or the operating system based on one or more stored register values corresponding to the performance target level.

8. A method, comprising:

determining a performance target level for a memory device;

selecting a first power state descriptor corresponding to a first level of a performance metric for the memory device above the performance target level of the performance metric;

selecting a second power state descriptor corresponding to a second level of the performance metric below the performance target level;

determining a first duration of time for operation of the memory device using the first power state descriptor;

determining a second duration of time for operation of the memory device using the second power state descriptor; and alternating operation of the memory device between the first power state descriptor in the first duration of time and the second power state descriptor in the second duration of time, wherein determining the first duration of time occurs prior to operating the memory device using the first power state descriptor in the first duration of time and determining the second duration of time occurs prior to operating the memory device using the second power state descriptor in the second duration of time.

9. The method of claim 8, wherein the performance metric comprises electric current used by the memory device.

10. The method of claim 8, wherein the performance metric comprises power consumption of the memory device.

11. The method of claim 8, wherein the performance metric comprises thermal capability of the memory device at a corresponding power consumption.

12. The method of claim 8, wherein selecting the first power state descriptor, selecting the second power state descriptor, determining the first duration, determining the second duration, and alternating operation between the first power state descriptor and the second power state descriptor are performed by a baseboard management controller.

13. The method of claim 8, wherein selecting the first power state descriptor, selecting the second power state descriptor, determining the first duration, determining the second duration, and alternating operation between the first power state descriptor and the second power state descriptor are performed by a central processing unit of a host device for the memory device.

14. The method of claim 13, wherein the central processing unit uses an operating system or basic input/output system (BIOS) of the host device to control operation of the memory device by alternating between the first power state descriptor and the second power state descriptor via the operating system or the BIOS.

15. The method of claim 14, wherein the memory device comprises a non-volatile memory express (NVMe).

16. The method of claim 8, comprising:

determining a first difference between the first level of the performance metric and the performance target level; and determining a second difference between the second level of the performance metric and the performance target level, wherein alternating operation comprises operating with the first power state descriptor for the first duration proportional to the second difference and operating with the second power state descriptor for the second duration proportional to the first difference.

17. A non-transitory, computer-readable medium, comprising computer-readable instructions that, when executed by one or more processors of one or more computers, cause the one or more computers to:

select a first power state descriptor corresponding to a first level of a performance metric for a memory device active during a first period, wherein the selection of the first power state descriptor is based at least in part on a performance target of the memory device, wherein the first level is higher than a performance target level of the performance target in the performance metric;

select a second power state descriptor corresponding to a second level of the performance metric for the memory device active during a second period, wherein the selection of the second power state descriptor is based at least in part on the performance target, wherein the second level is lower than the performance target level of the performance target in the performance metric;

in the first period, operate the memory device with the first power state descriptor, a duration of the first period having been determined prior to operating, in the first period, the memory device with the first power state descriptor; and in the second period following the first period, operate the memory device with the second power state descriptor, a duration of the second period having been determined prior to operating, in the second period, the memory device with the second power state descriptor.

18. The non-transitory, computer-readable medium of claim 17, further comprising instructions to:

determine a first difference between the first level of the performance metric for the first power state descriptor and the performance target level; and determine a second difference between the second level of the performance metric for the second power state descriptor and the performance target level, wherein the first period is proportional in length to the second difference, and the second period is proportional in length to the first difference.

19. The non-transitory, computer-readable medium of claim 17, further comprising instructions to implement a basic input/output system (BIOS) for a host device hosting the memory device and to switch the memory device from the first power state descriptor to the second power state descriptor using the BIOS based at least in part on the performance target.

20. The non-transitory, computer-readable medium of claim 17, further comprising instructions to implement an operating system for a host device hosting the memory device and to switch the memory device from the first power state descriptor to the second power state descriptor using the operating system based at least in part on the performance target.

* * * * *